April 14, 1959

S. BIRKLAND ET AL 2,881,891

DRIVING CLUTCH MECHANISM

Filed Jan. 20, 1956

INVENTOR.
STELLAN BIRKLAND
ROGER B. NEUBERGER
BY *Charles H. Erne*
*Leland R. McCann*
*George W. Reifer*
ATTORNEYS April 14, 1959

S. BIRKLAND ET AL 2,881,891

DRIVING CLUTCH MECHANISM

Filed Jan. 20, 1956

INVENTOR.
STELLAN BIRKLAND
ROGER B. NEUBERGER
BY
ATTORNEYS

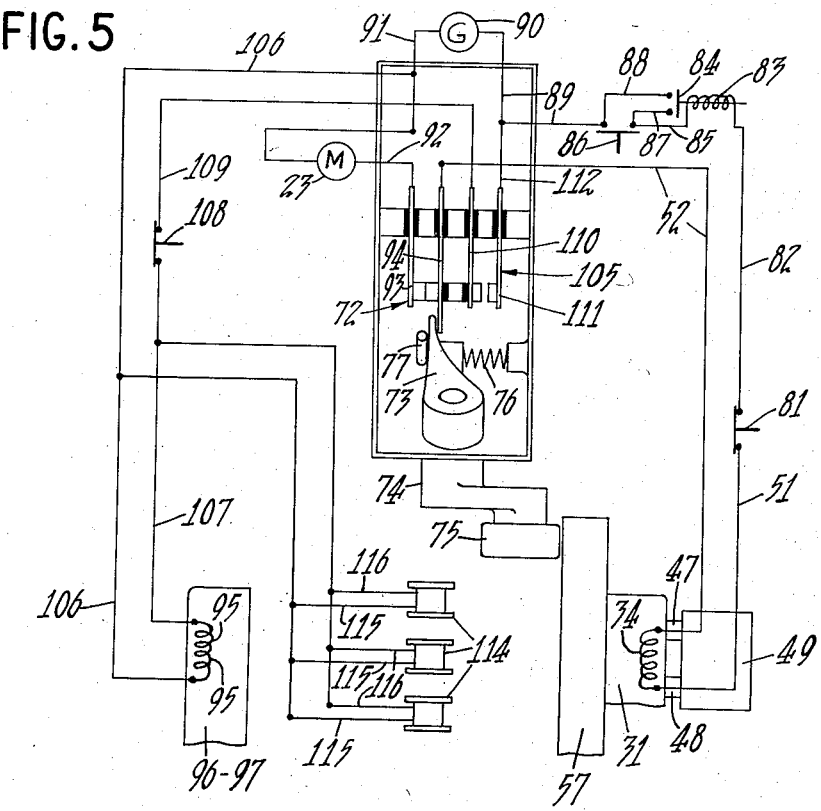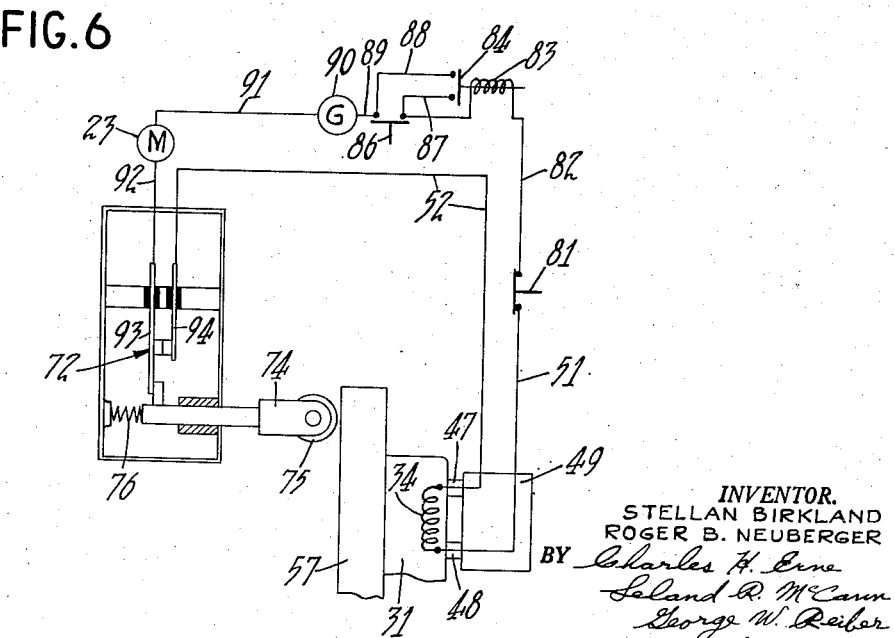

United States Patent Office 2,881,891
Patented Apr. 14, 1959

2,881,891

DRIVING CLUTCH MECHANISM

Stellan Birkland, San Francisco, and Roger B. Neuberger, San Mateo, Calif., assignors to American Can Company, New York, N.Y., a corporation of New Jersey Application January 20, 1956, Serial No. 560,334

3 Claims. (Cl. 192—84)

The present invention relates to a driving clutch mechanism for machines and has particular reference to an improved slip clutch device which is responsive to an electrical impulse.

In machines for performing a plurality of operations on material to be converted into finished or partially finished articles, slip clutches are often utilized to disengage working parts of the machines from the main source of power, when work jams in the machines create overloads which would otherwise damage or break machine parts and thereby cause shut-downs until the machines are repaired. In certain kinds of machines where operations are performed in timed order, the slip clutches are further arranged to maintain this timed relation and to reestablish such timed relation after a declutching operation. However such slip clutches are of little value in controlling machine operations where no distinct overload occurs. The instant invention contemplates the provision of such a slip clutch which is improved so as to be effective for work jams and other irregularities where no distinct overload occurs.

It is therefore an object of the instant invention to provide a slip clutch mechanism which is responsive to abnormal working conditions in a machine where no distinct overload occurs as well as where such conditions do create a distinct overload so that such clutches may be utilized in machines for working light weight materials such as paper and the like as well as in machines for working heavy or stiff materials such as tin plate or black iron plate or the like.

Another object is the provision of such an improved slip clutch mechanism which is responsive to an electrical impulse so that sensitive electric detectors located at various places in the machine may be utilized to detect work jam irregularities which do not create a distinct overload on the machine parts.

Another object is the provision of such an electrically responsive slip clutch mechanism which may be easily adjusted to varying loads by regulation of the voltage passed through it, thus compensating for starting loads without slipping.

Another object is the provision of such a clutch mechanism wherein the slip or driven parts of the mechanism may be held in disengaged relation to the driving parts after such a disengagement to prevent interference of these parts under conditions where it is undesirable to effect stoppage of the driving parts, such as where it is desired to stop one section of a machine and keep another section in operation.

Another object is the provision of such a slip clutch mechanism wherein complete control over the mechanism as to disengagement, breaking and re-engagement may be had through electrical impulses so that such control may be effected from remote stations in the machine.

Numerous other objects and advantages of the invention will be apparent as it is better understood from the following description, which, taken in connection with the accompanying drawings, discloses a preferred embodiment thereof.

Referring to the drawings:

Fig. 5 is a wiring diagram of the electrical apparatus used in the clutch mechanism as shown in Figs. 1 and 2; and Fig. 6 is a wiring diagram of the electrical apparatus used in the modified clutch mechanism shown in Figs. 3 and 4.

Figure 1:
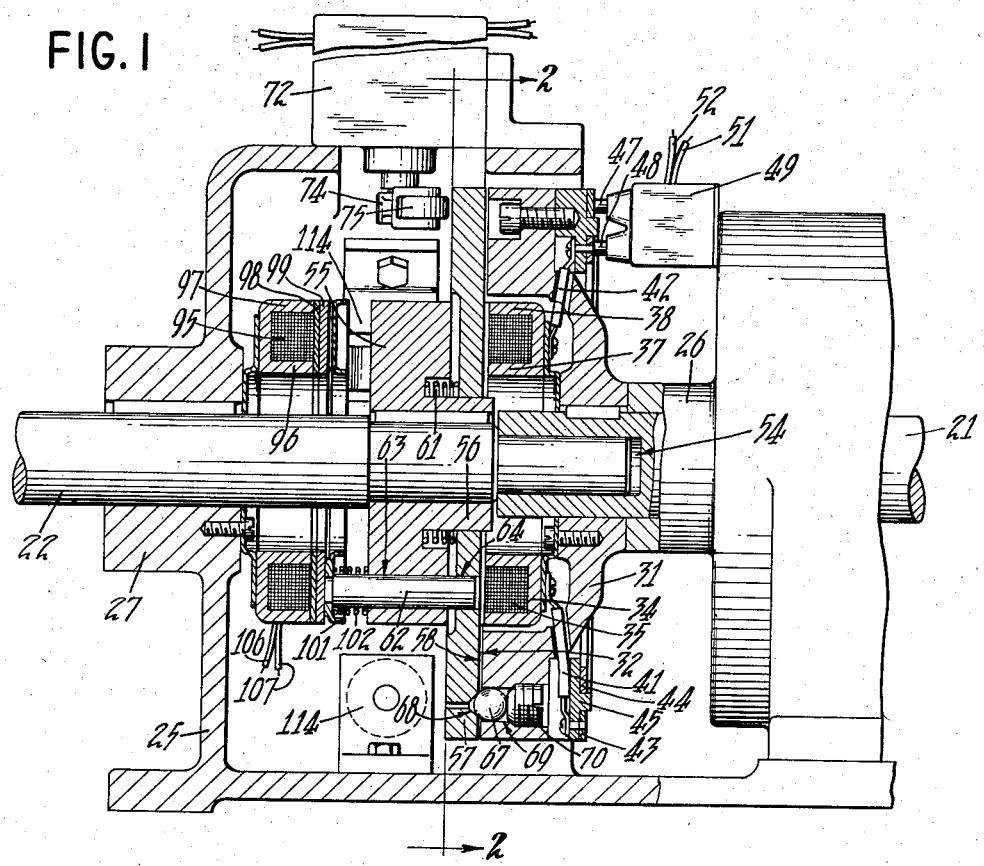
Figure 1 is a sectional view of a slip clutch mechanism embodying the instant invention, parts being broken away.
Figure 2:
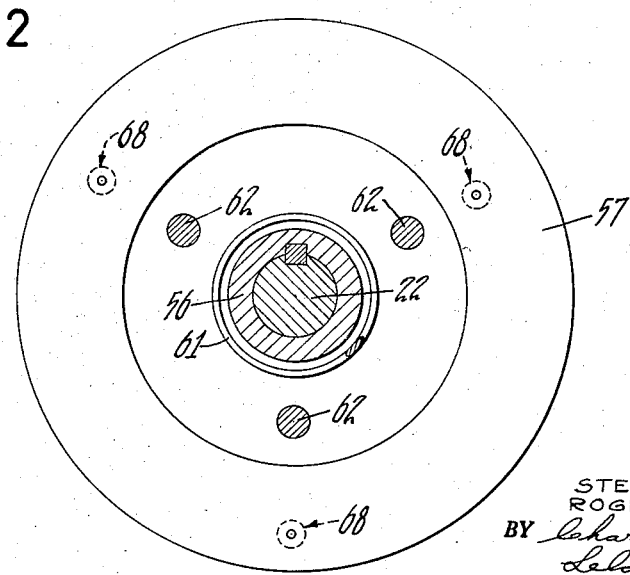
Fig. 2 is a sectional view taken substantially along the line 2—2 in Fig. 1.

As a preferred or exemplary embodiment of the instant invention, Figs. 1, 2 and 5 of the drawings illustrate a slip driving clutch mechanism which may be mounted as a single unit on adjacent ends of two connecting rotatable shafts, or in some cases reciprocable elements of two devices or portions of a single machine or of two adjacent separate machines for driving one of the devices, portions or machines from the other device, portion or machine in timed relation therewith and for disconnecting or disengaging one device, portion or machine from the other when an abnormal working condition occurs. As shown in the drawings one of the shafts constitutes a drive shaft or member 21 and the other a driven shaft or member 22. The drive shaft 21 may be driven in any suitable manner as by an electric motor 23 indicated in the wiring diagram in Fig. 5.

The clutch mechanism preferably is disposed in a housing 25 having a pair of spaced and axially aligned bearings 26, 27 in which the respective shafts 21, 22 are journaled. Within the housing 25, the driving shaft 21 carries a driving head which preferably comprises a concave dish shaped non-magnetic driving clutch member 31 which surrounds the shaft 21 and is keyed thereto for rotation therewith. This clutch member 31 is provided with a flat clutch face 32.

The dish shaped driving clutch member 31 contains a driving magnet 34, which preferably is an electromagnet of annular shape, concentrically surrounding the driving shaft 21 and secured to the clutch member 31 for rotation therewith. This magnet 34 comprises an annular coil 35 disposed within a U-shaped annulus having radially spaced inner and outer legs which constitute inner and outer pole pieces 37, 38 which terminate adjacent and just short of the flat face 32 of the clutch member 31 so as to be close to but not flush with the face 32. The magnet 34 is connected by wires 41, 42 to a pair of spaced and concentric collector rings 43, 44 secured to an electric insulating pad 45 carried on the back of the clutch member 31 and rotatable therewith. The rings 43, 44 engage against a pair of brushes 47, 48 of a stationary commutator 49 secured to the housing 25. The commutator 49 is connected by wires 51, 52 to a source of electric current as will be explained hereinafter, to energize the electromagnet 34.

At the driven member end of the clutch mechanism, the end of the driven shaft 22 preferably is reduced in diameter and journaled in a bore 54 formed in the end of the driving shaft 21 to partially support the ends of the shafts intermediate the bearings 26, 27. Adjacent the driving clutch member 31 and in axial alignment therewith, the driven shaft 22 carries a non-magnetizable hub 55 which is keyed, in a fixed position, to the shaft for rotation therewith. The hub 55, adjacent the driving clutch member 31, is formed with a reduced diameter auxiliary hub 56 which slidably supports a surrounding magnetizable driven slip clutch plate 57 having a flat face 58 which normally is disposed adjacent the flat face 32 of the driving clutch member 31 for attraction by the electromagnet 34. A compression spring 61 surrounding the auxiliary hub 56 and interposed between the hub 55 and the slip plate 57 lightly pushes the plate toward the magnet 34. The plate 57 is prevented from rotating on the auxiliary hub 56, by a plurality of retainer pins 62 which slidably fit into aligned bores 63, 64 in the hub 55 and the plate 57.

In normal operation of the machines or portions or devices thereof connected by the slip clutch mechanism as hereinbefore mentioned, the electromagnet 34 on the driving member or shaft 21 is maintained in an energized condition and thus attracts and holds the slip clutch plate 57 substantially engaged with it so as to drive the driven member 22 and parts connected thereto in unison with the driving members.

When an abnormal condition occurs in the driven machine or portion or device thereof, which requires stoppage of these parts, the slip clutch plate 57 is immediately disengaged from the driving members of the clutch mechanism to release the driven members and thereby effect the required stoppage. Under such conditions it is often desirable to stop operation of the driving members also so as to stop the entire apparatus.

The disengagement of the slip clutch plate 57 is effected by a rotative slippage of the plate relative to the driving members of the mechanism. This slippage may be created in two ways, as by a distinct strain and retarding action on the plate such as caused by an overload in the machine or by a deenergization of the driving electromagnet 34 where no distinct strain or overload occurs. In both cases, slippage of the clutch plate 57 causes its axial displacement and hence disengagement from the driving electromagnet 34.

The displacement of the plate 57 from the magnet 34 is effected by a wedging action of instrumentalities which preferably are a plurality of projections 67 which extend out from the flat face 32 of the driving clutch member 31 and which engage in tapered seats 68 in the face 58 of the slip plate. These projections 67 preferably are small balls housed in bores 69 formed in the driving clutch member 31. The balls are backed up and held in position by adjustable set screws 70 threadedly engaged in the bores 69.

When the clutch plate 57 slips relative to the driving electromagnet 34, the slipping action causes the plate to become unseated from the displacement projections 67 and to thereby ride up onto the balls. This action pushes the plate axially away from the electromagnet 34 out of its range of intense magnetic attraction and thereby causes the plate to become released or disengaged from the driving members of the clutch mechanism. The machine parts connected with the driven members of the clutch thereby cease operation.

Where this disengaging action of the slip plate 57 is effected by a strain or overload on the driven parts of the clutch mechanism, it is desirable to immediately deenergize the driving electromagnet 34. The electric motor 23 which furnishes the power for the driving members may also be stopped if desired. These actions preferably are effected by actuation of a normally closed electric switch 72 (Figs. 1 and 5) having pivoted, connected actuating arms 73, 74 carrying a roller 75 which rides against the back of the slip clutch plate 57. The arm 73 is yieldably held by a compression spring 76 (Fig. 5) against a stop 77 to keep the switch closed and to keep the roller 75 in position adjacent the slip clutch plate 57.

The electric switch 72 is part of a closed electric circuit which includes the motor 23, the driving electromagnet 34 and the lead wires 51, 52 which connect with the commutator 49 as shown in Fig. 5. In this circuit, wire 51 connects with one or more normally closed control switches 81 which are distributed throughout the machine at points of potential irregularities as hereinbefore mentioned. This switch or switches 81 are connected by a wire 82 to a relay solenoid 83 of a normally open relay switch 84. The solenoid 83 also is connected by a wire 85 to a normally open starting switch 86 having contacts connected by by-pass wires 87, 88 to the normally open contacts of the relay switch 84. The starting switch 86 is also connected by a wire 89 to a source of electric current such as a generator 90. The generator is also connected by a wire 91 to the motor 23 which in turn is connected by a wire 92 to a stationary contact 93 of the normally closed switch 72. A movable contact 94 of the switch 72 is connected by the wire 52 to the commutator 49.

To start the machine, the start switch 86 is manually closed momentarily. This establishes the circuit and causes electric current to flow through the solenoid 83 and thus close the relay switch 84 and thereby set up a holding circuit through the wires 87, 88 to by-pass the starting switch 86 so as to keep the main circuit established when the starting switch is released. With the relay switch 84, the control switches 81, and the switch 72 all closed, the electric current sets the motor 23 in operation and energizes the driving magnet 34 to set the driving members in operation and to operate the driven members through the driving members. This normal operation continues as long as no overload or irregularities occur which would trip and open any one of the control switches 81.

When a control switch 81 is opened, it breaks the circuit and the driving magnet 34 is immediately deenergized. This deenergization of the magnet causes it to release its hold on the driven slip clutch plate 57 and the plate thereupon tends to drag and slip back relative to the magnet thereby causing it to ride up on the clutch member projections 67 and become displaced axially away from the magnet so as to actuate and open the switch 72 to insure that the magnet 34 is kept deenergized until investigation of the cause of the opening of the control switch 81 is completed.

This same action takes place when a distinct overload in the driven section of the machine occurs, except that in this case the overload tends to retard and cause the slip plate 57 to slip and become displaced and thereby open the switch 72 first. The opening of this switch 72 breaks the circuit initially instead of one of the control switches 81 and thereby deenergizes the magnet 34 to release the slip plate 57 from the magnet. In either of these cases the motor 23 in the circuit becomes deenergized and stops to cease operation of the entire machine.

It should be understood that in stopping the machine the working parts continue to rotate through several rotations before complete stoppage is obtained. To reduce this momentum of the machine parts a brake is applied to the driven parts of the machine. For this purpose a conventional electromagnetic brake is utilized. Such a brake is disclosed in United States Patent 2,507,573 issued May 16, 1950 to J. G. Oetzel on Electromagnetic Friction Device. Such a brake briefly comprises an annular coil 95 (Fig. 1) disposed between a pair of annular radially spaced stationary pole pieces 96, 97, concentrically surrounding the driven shaft 22 and mounted on the clutch housing 25 adjacent the driven shaft bearing 27. The pole pieces 96, 97 are bridged across with a ring-like armature 98 carrying on its outer face a fibrous brake liner 99. The brake liner 99 is adapted to be engaged under braking conditions, by a magnetizable brake ring 101 which is mounted on the outer ends of the clutch plate pins 62 for rotation with the driven hub 55 and the slip plate 57 on the driven shaft 22. Light compression springs 102 interposed between the brake ring 101 and the hub 55 keep the brake ring in position close to the brake liner 99.

The brake coil 95 preferably is normally deenergized and is energized simultaneously with the deenergization of the driving magnet 34 so as to make the brake effective only when a declutching operation takes place. This synchronized energization of the brake is effected through a normally open brake switch 105 (Fig. 5) which is associated with the driving magnet switch 72. For this purpose the brake coil 95 is connected by a wire 106 to the generator wire 91 and is also connected by a wire 107 to one side of a normally closed brake release switch 108. The other side of the switch 108 is connected by a wire 109 to a movable contact 110 of the brake switch 105. The movable contact 110 is connected with and is insulated from the movable contact 94 of the switch 72 for movement simultaneously therewith. The opposite contact 111 of the brake switch 105 is connected by a wire 112 to the generator wire 89.

Hence when the normally closed driving magnet switch 72 is opened to deenergize the driving magnet 34, the brake switch 105 is closed and this establishes the brake circuit and energizes the brake coil 95. Thus this double action releases the slip plate 57 from the magnet 34 and simultaneously stops the brake ring 101 and parts connected thereto by attraction of the ring to the stationary energized brake coil 95. This stops rotation of the driven members of the clutch mechanism and the machine parts connected thereto. The brake release switch 108 is opened manually to break the circuit and thus deenergize the brake coil 95 to release the brake ring 101 when restarting the machine.

Provision is made for holding the slip clutch plate 57 in a displaced position away from the driving magnet 34 upon slippage of the plate, so as to prevent bumping of the projections or balls 67 into and out of the plate recesses 68 during stoppage of the machine. For this purpose the clutch housing 25 carries a plurality of stationary magnets 114 (Fig. 1) preferably electromagnets, which are disposed adjacent the path of rotation of the slip clutch plate 57 in spaced relation thereto for holding engagement with the plate when the plate is axially displaced. These holding magnets 114 preferably are normally deenergized and are energized simultaneously with the brake coil 95. To effect this simultaneous energization the holding magnets 114 are connected by wires 115, 116 to the respective wires 106, 107 of the brake circuit.

Upon releasing the slip clutch plate 57 for reengagement with the driving clutch magnet 34 after a declutching operation, it is desired to synchronize the driven members and the machine parts connected therewith, with the driving members and parts connected therewith. For this purpose, each set of projections or balls 67 and its cooperating plate recesses 68 (Fig. 1) is located a different radial distance from the axis of the driving shaft 21 as shown in Fig. 2 so that each projection 67 will align with and fit into only its own recess 68. This realignment of a projection 67 and its recess 68 can happen only once for a complete revolution of the plate 57 hence the machine parts are properly aligned whenever the projections 67 are seated in their own recesses 68.

Figure 3:
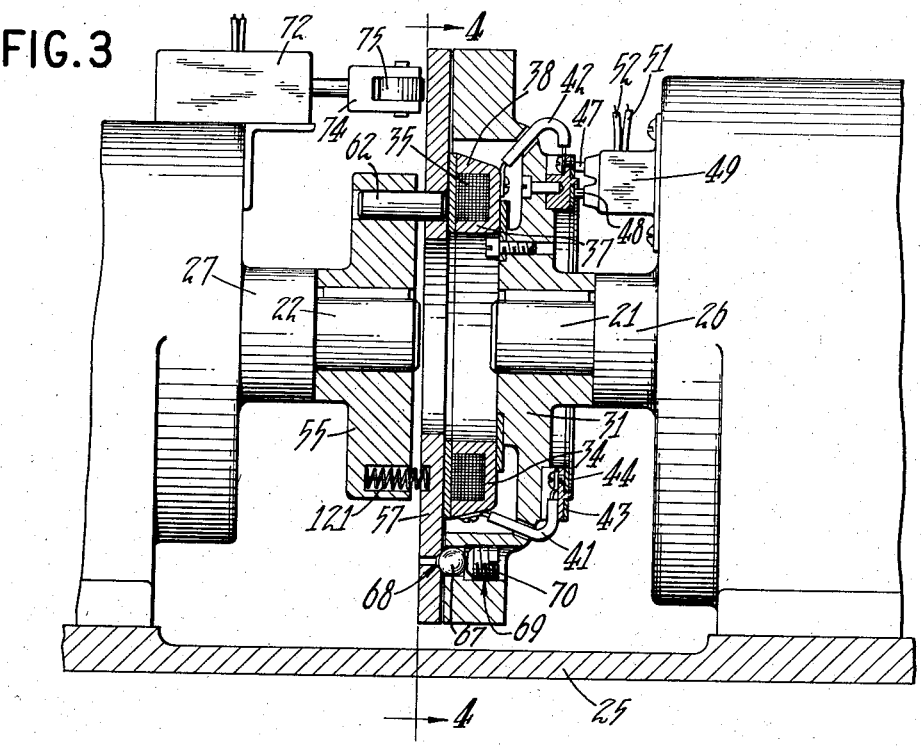
Fig. 3 is a view similar to Fig. 1 and showing a modified form of the invention.
Figure 4:
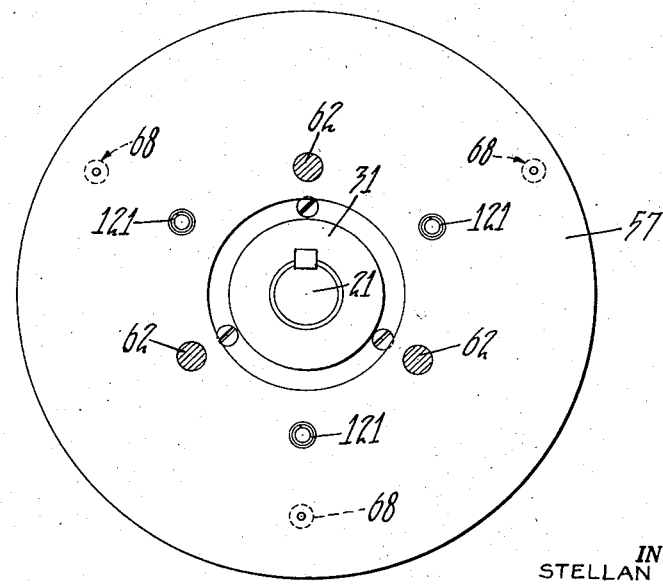
Fig. 4 is a sectional view taken substantially along the line 4—4 in Fig. 3.

In a modified form of the invention as disclosed in Figs. 3, 4 and 6, the brake and the slip plate holding magnets 114 are omitted. This modified form of clutch mechanism is sometimes used in smaller machines and in apparatus where the momentum of moving parts is readily overcome. In such a modified clutch mechanism the driving shaft 21 (Fig. 3) carries a dish shaped non-magnetizable clutch member 31 similar to the member 31 of the preferred form and is provided with a similar driving magnet 34, preferably an electromagnet, connected through insulated collector rings 43, 44 to the commutator 49. The commutator 49 as in the preferred form is connected by the wires 51, 52 (Fig. 6) of a normally closed circuit, to the generator 90. As in the preferred form the circuit includes the motor 23, the generator 90, the electric switch 72, the starting switch 86 and its relay switch 84 and solenoid 83, and one or more control switches 81. Operation of the clutch mechanism through energization and deenergization of the driving magnet 34 is the same as in the preferred form of the invention.

At the driven end of the clutch mechanism, the driven shaft 22 carries a non-magnetizable hub 55 similar to the hub 55 of the preferred form. The hub 55 carries a plurality of support pins 62 which support for axial sliding action thereon the slip plate 57. The pins connect the plate with the hub and driven shaft 22 as in the preferred form. Compression springs 121 interposed between the hub 55 and the slip plate 57 provide for yieldable axial displacement of the plate relative to the driving magnet 34 under slippage of the plate as in the preferred form. Displacement of the plate 57 is effected by projections or balls 67 in the clutch member 31 and cooperating recesses 68 in the plate 57 as in the preferred form. The recesses 68 are radially disposed at different distances from the axis of the driving shaft 21 as in the preferred form to properly synchronize the driven members with the driving members after a declutching operation.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A driving clutch mechanism for machines, comprising in combination a driving clutch member, a driven clutch member, a slip clutch plate yieldably carried on and movable with one of said clutch members, a normally energized clutch electromagnet carried on and movable with the other of said members and engageable against said clutch plate for connecting and moving said clutch members in unison, separating means interposed between said clutch plate and the clutch member carrying said electromagnet and operable through slippage of said plate relative to said electromagnet to separate said plate from said electromagnet and thus disengage the clutch members when the torque between said members is excessive, an electromagnetic brake for stopping said driven clutch member, an electric clutch switch electrically connected with said clutch electromagnet and said electromagnetic brake and operable by said clutch plate upon disengagement of said plate from said clutch electromagnet for substantially simultaneously deenergizing said clutch electromagnet and energizing said electromagnetic brake, and at least one remote control electric switch connected with said clutch electromagnet and operable by an abnormal condition in the machine to deenergize said clutch electromagnet, whereby said abnormal condition operates said remote control switch to deenergize said clutch electromagnet so that the torque which would normally be transmitted by said clutch members causes said plate to slip relative to said deenergized electromagnet and thus cause said separating means to separate said plate from said electromagnet and operate said electric clutch switch to energize said brake to stop said disengaged driven clutch member.

2. A driving clutch mechanism of the character defined in claim 1 wherein there is provided electromagnetic means also connected with said clutch switch for withdrawing and holding apart said separating means between said clutch members while said clutch electromagnet is deenergized and said electromagnetic brake is energized.

3. A driving clutch mechanism for machines, comprising in combination a driving clutch member, a driven clutch member, a slip clutch plate yieldably carried on and movable with one of said clutch members, a normally energized clutch electromagnet carried on and movable with the other of said members and engageable against said clutch plate for connecting and moving said clutch members in unison, separating means interposed between said clutch plate and the clutch member carrying said electromagnet and operable through slippage of said plate relative to said electromagnet to separate said plate from said electromagnet and thus disengage the clutch members when the torque between said members is excessive, electromagnetic holding means for retaining said separating means in inactive condition when they have thus disengaged the clutch members, an electromagnetic brake for stopping said driven clutch member, and a clutch switch electrically connected with said clutch electromagnet, electromagnetic holding means and electromagnetic brake and operable by said separating means upon disengagement of said plate from said clutch members for substantially simultaneously deenergizing said clutch electromagnet and energizing said electromagnetic holding means and said electromagnetic brake, whereby application of excessive torque to said clutch members operates said electric clutch switch to retain the clutch members out of engagement while said brake stops said disengaged clutch member.

References Cited in the file of this patent

UNITED STATES PATENTS

| | | |
|---|---|---|
| 1,155,124 | Berger | Sept. 28, 1915 |
| 1,491,426 | Schunemann | Apr. 22, 1924 |
| 1,515,774 | Jones | Nov. 18, 1924 |
| 1,938,720 | Preble | Dec. 12, 1933 |
| 2,068,260 | Biggert | Jan. 19, 1937 |
| 2,497,893 | Linaham | Feb. 21, 1950 |
| 2,687,197 | Leifer | Aug. 24, 1954 |

FOREIGN PATENTS

| | | |
|---|---|---|
| 892,405 | Germany | Oct. 8, 1953 |